United States Patent [19]

Joyner

[11] Patent Number: 5,123,834
[45] Date of Patent: Jun. 23, 1992

[54] MOLD SUPPORT PLATEN STRUCTURE

[75] Inventor: Van K. Joyner, West Chester, Ohio

[73] Assignee: Cincinnati Milacron, Cincinnati, Ohio

[21] Appl. No.: 638,994

[22] Filed: Jan. 10, 1991

[51] Int. Cl.⁵ ............................................. B29C 45/66
[52] U.S. Cl. .................. 425/592; 425/451.5; 425/451.6; 425/593
[58] Field of Search ...................... 425/593, 592, 451.5, 425/451.6, 589, 591, 595, 450.1, 451

[56] References Cited

U.S. PATENT DOCUMENTS 3,245,122 4/1966 Maurer ................................. 425/593
3,597,798 8/1971 McDonald ........................... 425/593

OTHER PUBLICATIONS

Single Sheet Describing Clamping Unit of Injection Molding Machine, issued by Arburg Maschinenfabrik KG, of the Federal Republic of Germany.
"Arburg Allrounder", brochure published by Maschinenfabrik Hehl & Sohne, Lossburg, Germany, 20 pages, no publication date.
"Arburg Basic-Information", brochure published by Arburg Maschinenfabrik Hehl & Sohne, GmbH & Co. KG, Lossburg, Germany, 17 pages, printed in Jun. 1988.

Primary Examiner—Tim Heitbrink
Attorney, Agent, or Firm—Nies, Kurz, Bergert & Tamburro

[57] ABSTRACT

A movable platen structure for an injection molding machine in which the platen is in the form of a box-like structure that includes spaced front and rear plates. The platen structure includes a plurality of longitudinally extending beam members that interconnect the front and rear plates and are positioned in parallel relationship and in a generally rectangular array. The rear plate includes on its rear face a plurality of vertically extending pillow block members for pivotally carrying a pivot pin, the pillow block members having inclined sides that intersect with the rear face of the rear plate. Extending across the front face of the rear plate and opposite from the ends of the respective pillow blocks are an upper and a lower transverse beam member, each of which is formed integrally with the rear plate to provide additional structural stiffening and thereby permit the rear plate to be of a thinner and lighter structure.

11 Claims, 6 Drawing Sheets

MOLD SUPPORT PLATEN STRUCTURE

BACKGROUND OF THE INVENTION

1. Field of the Invention

The present invention relates to a structure for a movable platen for supporting a portion of an injection mold in an injection molding machine. More particularly, the present invention relates to a movable mold supporting platen that has improved rigidity, as well as improved stability, and that is slidably carried on injection molding machine tie rods.

2. Description of the Related Art

In general, machines for injection molding of plastics articles include a pair of fixed platens that are spaced from each other and that are interconnected by generally four parallel tie rods that have their axes positioned to define a rectangular array. One of the fixed platens remains stationary and is adapted to support one portion of a two or multiple piece injection mold that when assembled or engaged defines a mold cavity to correspond with the outline of a desired molded part. A movable platen is slidably carried on the tie rods between the fixed platens and is adapted to carry a cooperating portion of the mold so that when the movable platen is moved toward the mold-portion-carrying fixed platen the two mold portions come into contact to define therebetween a mold cavity for forming the desired part.

The movable platen is generally a plate-like structure that is of rectangular configuration and includes four bores at the respective corners, through each of which a tie rod extends. A movable platen actuation system is positioned between the non-mold-carrying fixed platen and the movable platen to cause the movable platen to move along the tie rods toward or away from the mold platen, and also to hold the movable platen firmly in position when the mold portions are together, to prevent separation of the molds as molten material is injected into the mold cavity under high pressure.

When the actuation force for moving the movable platen is applied centrally and in a direction parallel to the axes of the tie rods, the movable platen can be a relatively thin plate structure having a thickness sufficient to withstand the axial loads, because the actuation forces do not cause any cocking or tilting of the movable platen relative to the tie rods. However, if non-parallel actuation forces are imposed, such as would be the case in a single-toggle-type clamp actuation mechanism, then a thicker platen can be provided for larger contact area between the tie rod bores of the movable platen and the tie rods to distribute over a larger area the cocking or tilting forces that result from the single toggle clamp actuation arrangement. However, in providing a greater contact area between the movable platen and the tie rods by means of a thicker platen, additional weight is added to the movable platen, which undesirably increases the inertia of the movable platen and slows its movement, thereby increasing the overall molding cycle time.

It is an object of the present invention to provide an improved movable platen structure that overcomes the problems in the previously employed platen structures.

It is a further object of the present invention to provide an improved movable platen that has a greater contact area with the tie rods to minimize wear and that does not have significantly greater inertia.

It is a still further object of the present invention to provide a movable platen that can accept non-axial actuation forces without excessive wear between the tie rod bores and the tie rods.

SUMMARY OF THE INVENTION

Briefly stated, in accordance with one aspect of the present invention, a mold support platen is provided for an injection molding machine. The platen includes a substantially rectangular front plate member having a planar front face adapted to carry a mold member, and a rear face spaced from the front face, the front plate member including a plurality of spaced front guide apertures having their axes disposed in parallel relationship and substantially perpendicular to the front face. The guide apertures extend between and through the front and rear faces.

A substantially rectangular rear plate member is provided and is spaced from the front plate member. The rear plate member includes a front face in opposed relationship with the rear face of the front plate member, and a rear face spaced from the rear plate member front face and including a plurality of spaced rear guide apertures corresponding in size and number with the front guide apertures. The respective rear guide apertures are disposed in coaxial relationship with corresponding front guide apertures in the front plate member to permit the front and rear plate members to each be slidably carried on a plurality of parallel tie rods that are adapted to pass through the respective ones of the front and rear guide apertures.

A plurality of longitudinal beam members extend between and interconnect the front and rear plate members to maintain the plate members in spaced relationship. Additionally, a pair of transverse beam members is provided on the front face of the rear plate member in spaced relationship with each other to provide bracing for the rear plate member. Further, a connection arrangement is provided for connecting an actuator to the rear plate member to move the movable platen along the tie rods toward and away from a mold-carrying stationary platen. The rear plate member includes actuator connecting means carried on the rear face of the rear plate member at a position opposite the transverse beam members.

DESCRIPTION OF THE PREFERRED EMBODIMENTS

Figure 1:
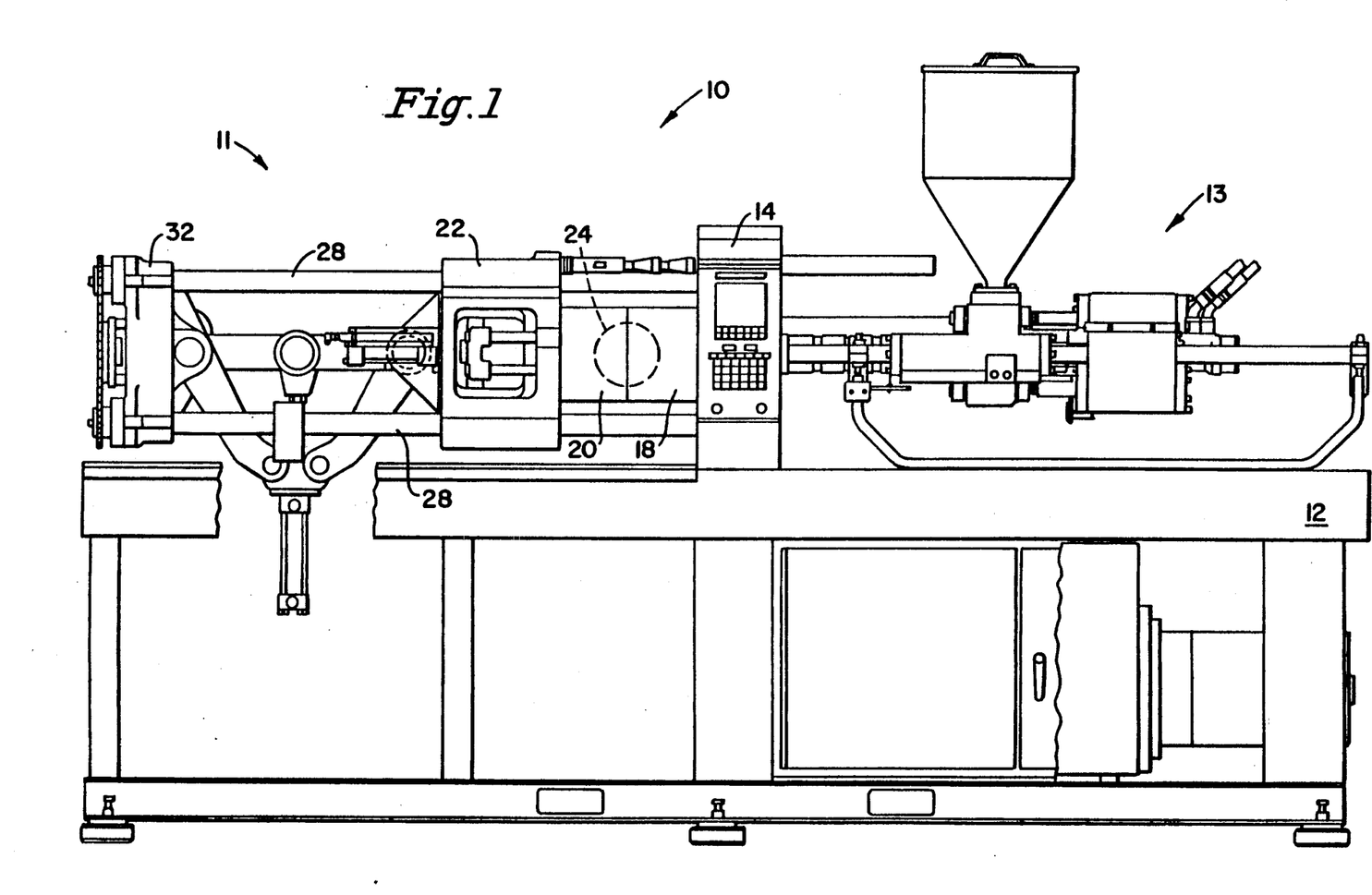
FIG. 1 is a side elevational view of an injection molding machine including a movable platen carrying part ejection apparatus in accordance with the present invention, and showing a single-toggle-type mold actuating and clamping mechanism in its fully extended position with the mold portions in contact with each other.

Referring now to the drawings, and particularly to FIG. 1 thereof, there is shown an injection molding machine 10 that includes a base 12 that supports a plastication and injection system 13 for plasticating a solid polymeric material into a flowable, viscous form and for injecting the plasticated material into a mold cavity 24 defined by a pair of cooperating mold portions 18, 20 that are movable relative to each other to selectively open and close mold cavity 24.

Mold portion 20 is supported for movement toward and away from mold portion 18 by a mold traversing and clamping system 11 that includes a stationary platen 14 connected to base 12 to securely support mold portion 18. Mold portion 20 is secured to a movable platen 22 that is slidably carried on tie rods 28 that extend between stationary platen 14 and a die height platen 32, which is also carried on base 12. Mold traversing and clamping system 11 is a toggle-type system that is provided for traversing mold portion 20 toward and away from mold portion 18, and for securely holding together mold portions 18 and 20 while plasticated material is injected into mold cavity 24 under high pressure.

Figure 2:
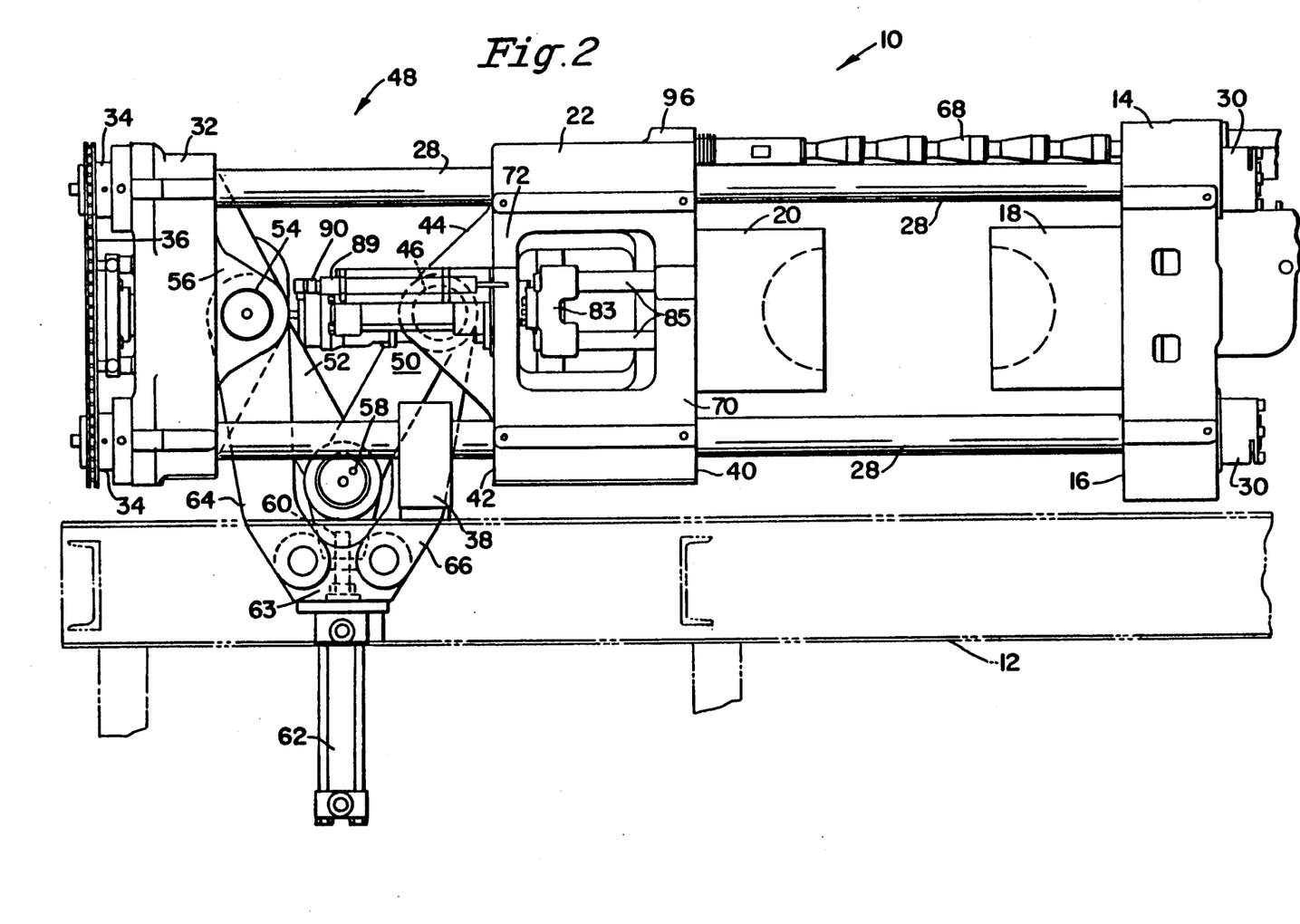
FIG. 2 is an enlarged side elevational view of the mold clamping system for the molding machine shown in FIG. 1 showing the single toggle platen actuating arrangement and the movable platen in their fully retracted positions relative to a fixed, mold-carrying platen.
Figure 3:
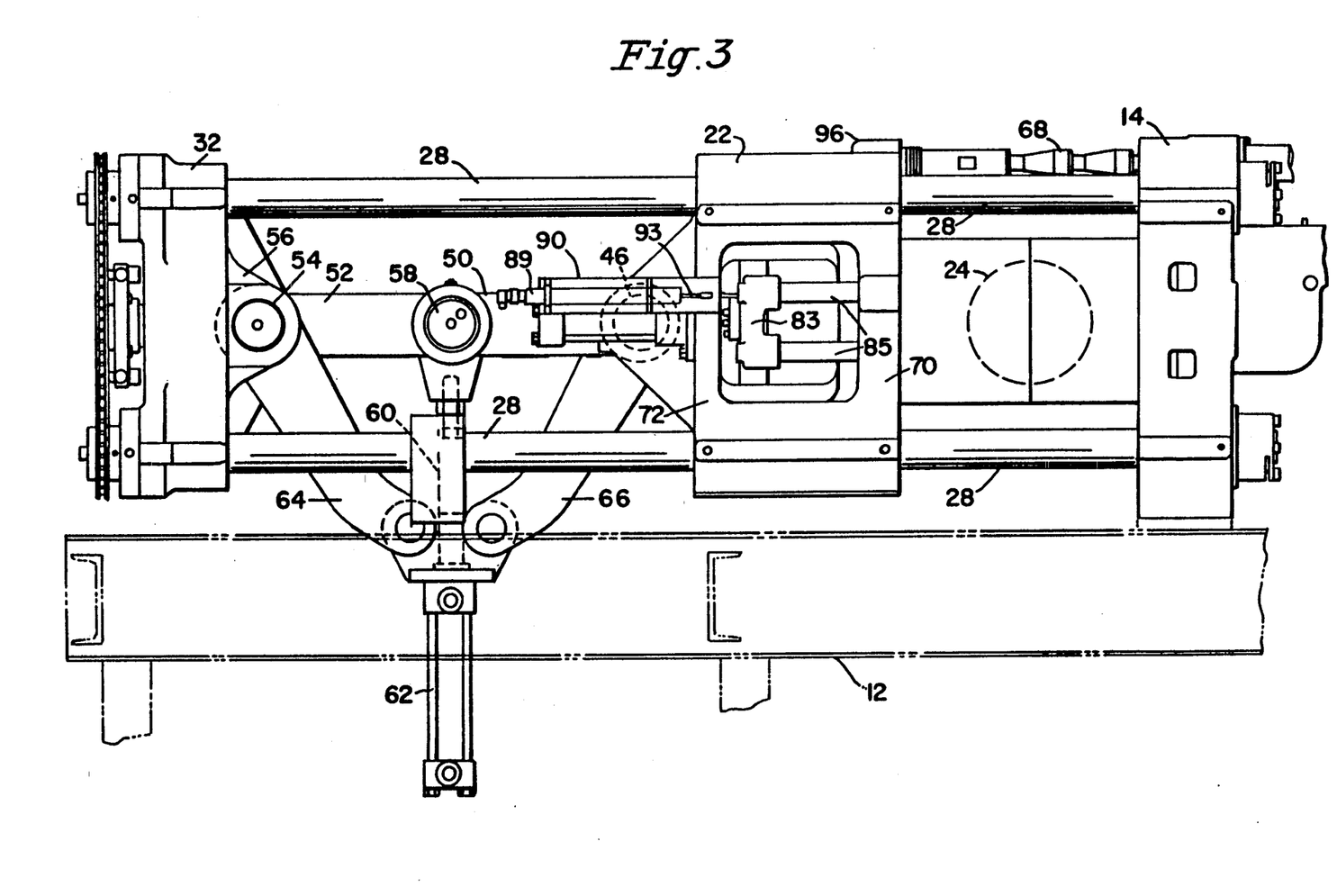
FIG. 3 is a side elevational view similar to that of FIG. 2, but showing the single toggle platen actuation arrangement and the movable platen in their fully extended positions.

Mold traversing and clamping system 11 is shown in enlarged detail in FIGS. 2 and 3. Mold traversing and clamping system 11 is mounted on machine base 12, which is of generally rectangular form and of a construction that is well known to those skilled in the art. Stationary platen 14, which is a generally rectangular structure, is rigidly secured to base 12 and includes a planar face 16 to which mold portion 18 is securely connected.

Positioned adjacent stationary platen 14 on the side opposite from face 16 is plastication and injection system 13, only a portion of which is shown in FIGS. 2 and 3, which plasticates originally solid plastics particles or powders to provide a molten, flowable mass suitable for injection into mold cavity 24. Injection system 13 includes a tubular barrel that rotatably carries a plasticating screw for plasticating the material, for conveying the plasticated material toward mold cavity 24, and for injecting the material into mold cavity 24 under high pressure. Because plastication and injection system 13 forms no part of the present invention, and because its structure and operation are well known to those skilled in the art, no further description of that unit will be provided herein.

Four parallel, cylindrical tie rods 28 are provided and have their respective longitudinal axes disposed in a generally rectangular array. Tie rods 28 extend from face 16 of stationary platen 14, and an end of each of tie rods 28 is secured in position relative to stationary platen 14, as by means of nuts 30. The opposite ends of tie rods 28 carry a die height platen 32, which is also intended to be stationary during a molding cycle. However, die height platen 32 is shiftable toward and away from stationary platen 14 by means of adjusting nuts 34 that are rotatably carried by die height platen 32 and that can be rotated by a drive chain 36 that passes around and drives respective sprockets 37 operatively connected with nuts 34. Adjusting nuts 34 engage with external threads formed on the ends of tie rods 28 and are threadedly carried by the respective tie rods so that rotation of nuts 34 causes die height platen 32 to be moved either toward or away from stationary platen 14 in order to accommodate molds having differing thicknesses. The two lowermost of tie rods 28 are held in position relative to machine base 12, at a point near die height platen 32, by respective tie rod supports 38, only one of which is visible in FIGS. 2 and 3.

Movable platen 22 is slidably carried on tie rods 28 and is positioned between die height platen 32 and stationary platen 14. Movable platen 22 includes a front face 40 that is opposite face 16 of stationary platen 14, and that carries mold portion 20 that is adapted to cooperatively engage with mold portion 18 to define therebetween one or more mold cavities into which the molten material is injected to form the desired parts. Rear face 42 of movable platen 22 carries a plurality of vertically extending, laterally spaced pillow blocks 44, sometimes also referred to as steeples, that have aligned bores to rotatably carry a front pivot pin 46, which is a part of a toggle-type platen actuating apparatus 48 for moving movable platen 22 toward and away from stationary platen 14.

Movable platen actuating apparatus 48 is in the form of a conventional toggle arm arrangement that provides a single toggle that includes a pair of toggle front links 50 that have one end pivotally carried on front pivot pin 46, and a pair of toggle rear links 52 that have one end pivotally carried on a rear pivot pin 54. Pin 54 is, in turn, carried in aligned bores formed in each of a plurality of laterally spaced, vertically extending die height platen pillow blocks 56. The respective toggle front and rear links are interconnected at their innermost free ends by a center pivot pin 58 that defines a toggle joint and that is operatively connected with the piston rod 60 of an hydraulic cylinder 62 that serves as the toggle actuator cylinder. Cylinder 62 is supported from a cross member 63 that is pivotally connected with a pair of toggle cylinder support links 64, 66 that have their opposite ends respectively pivotally carried by rear pivot pin 54 and front pivot pin 46.

In the position shown in FIG. 2, movable platen 22 is completely retracted from stationary platen 14. In that position piston rod 60 is fully retracted into toggle actuator cylinder 62, and toggle front and rear links 50, 52 are angularly positioned as shown.

In FIG. 3, movable platen 22 is shown in its fully extended position, relative to die height platen 32, and toggle actuator piston rod 60 is extended and in its uppermost position to cause the axis of center pivot pin 58 to lie on a line extending between the axes of front and rear pivot pins 46 and 54, so that respective toggle links 50 and 52 are coaxial. When movable platen 22 is in the position shown in FIG. 3, mold portions 18 and 20 are in contact and define therebetween closed mold cavity 24, into which the flowable molten plastic material is injected under high pressure. The aligned toggle links 50 and 52 serve to prevent movable platen 22 from moving away from stationary platen 14 as a result of the force imposed on the mold cavity surfaces by the pressure of the injected material. After the injected material has cooled, toggle piston rod 60 is retracted into toggle actuator cylinder 62, thereby drawing center pivot pin 58 toward cylinder 62 and causing movable platen 22 to move away from stationary platen 14 and toward die height platen 32, to separate the mold portions and permit the molded part to be removed from mold cavity 24.

Figure 4:
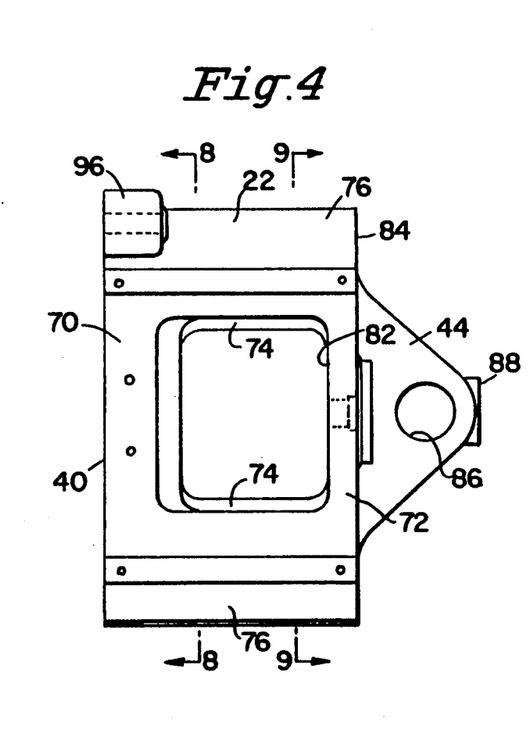
FIG. 4 is a side elevational view of the movable platen.
Figure 8:
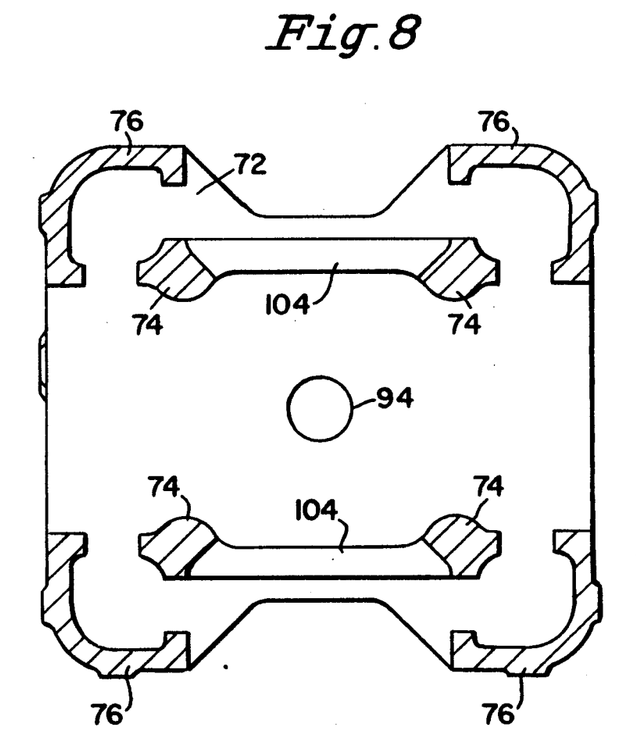
FIG. 8 is a transverse cross-sectional view of the movable platen shown in FIG. 4, taken along the line 7—7 thereof.
Figure 9:
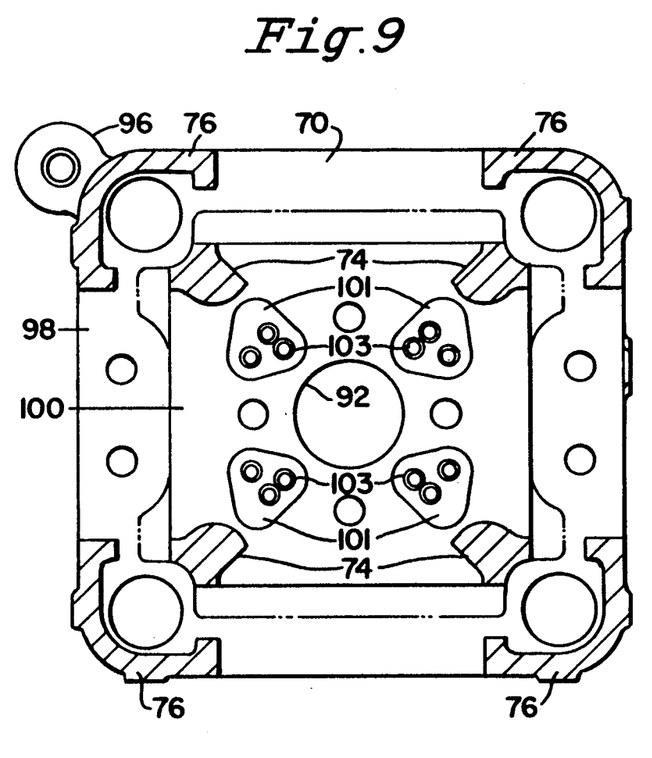
FIG. 9 is a transverse cross-sectional view of the movable platen shown in FIG. 4, taken along the line 8—8 thereof.
Figure 10:
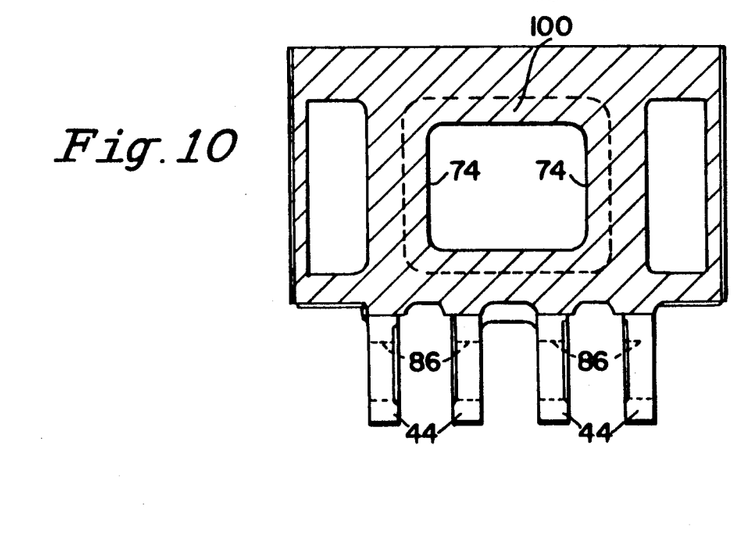
FIG. 10 is a longitudinal cross-sectional view of the movable platen shown in FIG. 5, taken along the line 9—9 thereof.

The structure of movable platen 22 is shown in further detail in FIGS. 4 through 10. As best seen in FIG. 4, platen 22 includes a front plate member 70 of generally rectangular configuration, and a rear plate member 72, also of generally rectangular configuration, rear plate member 72 being spaced from and substantially parallel with front plate member 70. Front and rear plate members 70 and 72 are interconnected by four longitudinally extending beam members 74 (only two of which are visible in FIG. 4) that have their axes in parallel relationship and that define a substantially rectangularly extending connecting structure between front and rear plate members 70 and 72. The cross-sectional views of FIGS. 8 and 9 show the positions of beam members 74 relative to each other. Additionally, movable platen 22 also includes tie rod outer cover members 76 that overlie and cover approximately 180° of the adjacent peripheral surfaces of tie rods 28, that pass through bores 78 in front plate member 70 and through bores 80 in rear plate member 72 (see FIGS. 5 and 6).

Because outer cover members 76 are of limited peripheral extent relative to tie rods 28, each of the top, bottom, and left and right side surfaces of movable platen 22 includes a generally rectangular opening 82 that permits access to the interior of movable platen 22 and that also serves to minimize the weight of platen 22.

Figure 5:
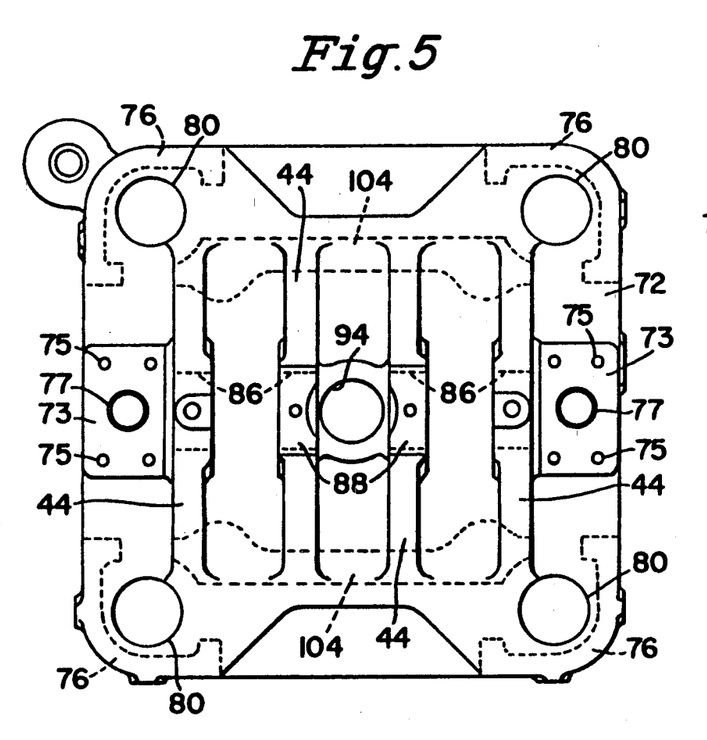
FIG. 5 is a rear elevational view of the movable platen shown in FIG. 4.
Figure 6:
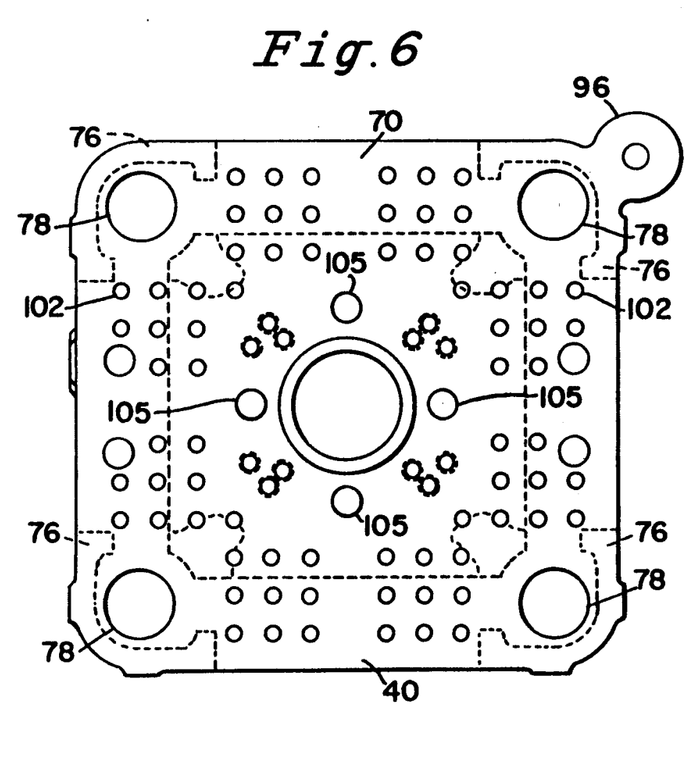
FIG. 6 is a front elevational view of the movable platen shown in FIG. 4.
Figure 7:
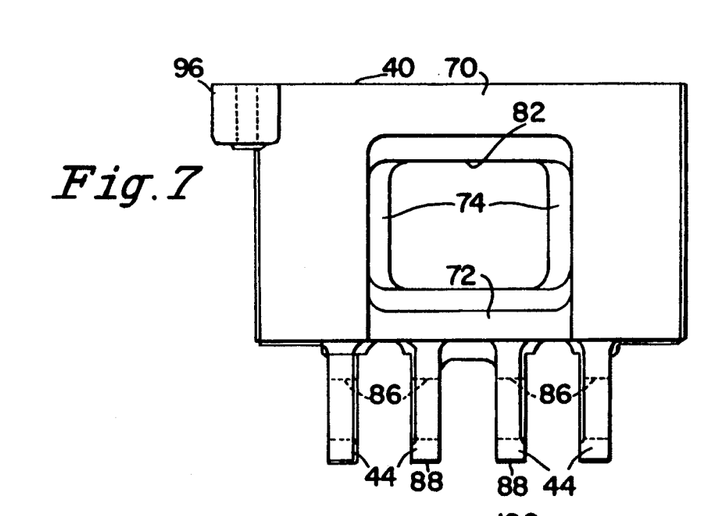
FIG. 7 is a top plan view of the movable platen shown in FIG. 4.

As best seen in FIGS. 4 and 5, rear plate member 72 includes a rear face 84 that carries four vertically extending, longitudinally spaced pillow blocks 44 that are substantially plate-like members that are of triangular configuration, and that have their respective longest sides coincident with rear face 84 of rear plate member 72. Each of pillow blocks 44 include respective aligned bores 86 to support front pivot pin 46 that pivotally carries front toggle links 50. The laterally outermost of pillow blocks 44 are spaced from the two innermost pillow blocks 44 by distances that correspond substantially with the thicknesses of the respective front toggle links 50 and toggle cylinder support links 66. Each of the two inner pillow blocks 44 has a flat, vertically extending surface 88 that defines an ejector cylinder mounting pad for supporting either a molded part ejector cylinder or a mold core unscrewing motor 90 (see FIGS. 2 and 3). The outer pillow blocks 44 can include similar vertically extending surfaces 89 for mounting other elements. Further, in addition to mounting ejector cylinders to surfaces 88, machined, vertically extending surfaces 91 can be provided on the rear face adjacent the lateral side surfaces of rear plate 72 to also permit mounting thereon of ejector cylinders, if desired.

Front and rear plate members 70, 72 each include respective centrally positioned, aligned bores 92, 94 to permit an ejector cylinder piston rod or an unscrewing motor drive shaft to pass therethrough for connection with cooperating part ejector structure carried by mold member 20.

As best seen in FIG. 9, plate member 70 has an outer peripheral portion 98 that is of a lesser thickness than that of inner portion 100. Recesses 101 are formed on the inner face of front plate member 70 to permit spot-faced clearance holes 103 to be provided and without the need for a counterbore on the inner surface of the plate. Front face 40 of plate member 70 is planar and extends substantially perpendicularly to the longitudinal axis of movable platen 22 and also includes a plurality of threaded bores 102 (see FIG. 6) that are arranged in a predetermined array to permit the positioning on front plate member 70 of any of a variety of different sizes of injection molds.

Referring now to FIGS. 4, 8, and 9, respective tie rod cover members 76 are positioned in diagonally opposed relationship and extend between front and rear plate members 70 and 72 to overlie portions of the adjacent tie rods 28 to thereby protect the tie rod surfaces from dirt and debris. Longitudinal beam members 74 are positioned diagonally inwardly of each of cover members 76 and accept and transfer any axial loads that are imposed on either of front and rear plate members 70 and 72. As seen in FIGS. 8 and 9, the respective longitudinal beam members are positioned at the corners of thickened center portion 100 of front plate member 70 and extend rearwardly toward and connect with rear plate member 72.

As best seen in FIG. 8, the inner face of rear plate member 72, the face that is opposite to front plate member 70, includes a pair of parallel, transverse beam members 104 that extend between and connect with the two upper longitudinal beam members 74 and with the two lower longitudinal beam members 74, respectively. Transverse beam members 104 provide additional structural bracing or support for rear plate member 72 to accept loads that are imposed longitudinally, and they thereby permit that plate member to have a lesser thickness than would otherwise be needed to withstand such loads. As shown, transverse beam members 104 are formed integrally with rear plate member 72 and are a part of the inner surface of the rear plate member.

Referring once again to FIG. 5, it can be seen that transverse beam members 104 are spaced from each other a distance that corresponds substantially with the vertical height of the respective front pivots pin pillow blocks 44. Because axially extending forces are transmitted from the toggle mechanism through pillow blocks 44 to plate member 72, the positioning of transverse beam members 104 as shown provides increased structural rigidity of the rear plate, and it serves to spread the axial forces over a greater area of rear plate member 72 to thereby permit the rear plate to have a lesser thickness and to reduce the weight of movable platen member 22. Additionally, the provision in rear plate member 72 of upper and lower notches 106 also reduces the weight of that component of the structure.

The positioning of front pivot pin pillow blocks 44 relative to transverse beam members 104 and the positioning of longitudinal beam members 74 provides a compact and rigid structure that effectively absorbs the loads that are imposed upon movable platen 22. Additionally, the spacing between front and rear plate members 70 and 72 and the combined bearing surface areas of the tie rod bores in the respective front and rear plate members provides increased guided length between movable platen 22 and respective tie rods 28, in order to accommodate the upward and downward forces that are imposed on movable platen 22 by the single toggle arrangement shown in FIGS. 1, 2, and 3. Thus, the disclosed structure is capable of accepting such vertical loads without excessive wear of either the movable platen or the tie rods by distributing the forces over larger bearing areas.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A mold support platen adapted to be slidably carried on a plurality of parallel guide rods, said platen comprising:
   a) a substantially rectangular front plate member having a planar front face adapted to carry a mold member and a rear face spaced from the front face, the front plate member including a plurality of spaced front guide apertures having their axes disposed in parallel relationship and substantially perpendicular to the front face, the guide apertures extending between and through the front and rear faces;
   b) a substantially rectangular rear plate member spaced from the front plate member, the rear plate member including a front face in opposed relationship with the rear face of the front plate member and a rear face spaced from the rear plate member front face, the rear plate member including a plurality of spaced rear guide apertures corresponding in size and number with the front guide apertures, the rear guide apertures disposed in coaxial relationship with the corresponding front guide apertures to permit the front and rear plate members to be slidably carried on a plurality of parallel tie rods adapted to pass through respective front and rear guide apertures;
   c) a plurality of longitudinal beam members extending between and interconnecting the front and rear plate members to maintain the platen members in spaced relationship, the longitudinal beam members positioned inwardly of and adjacent to each of the front and rear guide apertures;
   d) a pair of transverse beam members carried on the front face of the rear plate member in spaced relationship; and
   e) actuator connecting means for connecting an actuator to the rear plate member to move the platen along the guide rods toward and away from a stationary platen.

2. A mold support platen in accordance with claim 1 wherein the actuator for moving the platen includes a pivotable link having a first end pivotally connected with the rear plate member and having a second end pivotally connected with a toggle joint.

3. A mold support platen in accordance with claim 1 wherein the transverse beam members are formed integrally with the rear plate member.

4. A mold support platen in accordance with claim 1 wherein the actuator connecting means is positioned on the rear face of the rear plate member at a position opposite the transverse beam members.

5. A mold support platen in accordance with claim 4 wherein the actuator connecting means extends between and is opposite to the transverse beam members.

6. A mold support platen in accordance with claim 5 wherein the actuator connecting means includes a plurality of laterally spaced, parallel pillow blocks that have ends that terminate opposite the transverse beam members.

7. A mold support platen in accordance with claim 6 wherein the pillow blocks are of generally triangular shape having one leg of the triangular shape coincident with the rear face of the rear plate member, the triangular shapes extending outwardly from the rear face of the rear plate member.

8. A mold support platen in accordance with claim 7 wherein the pillow blocks are integrally formed with the rear plate member.

9. A mold support platen movable along a plurality of parallel tie rods, said mold platen comprising:
   a) a forward plate member having a planar front face to support a part of a multiple part mold and including bores adapted to receive the tie rods;
   b) a rear plate member spaced from the forward plate member and having connection means for connecting the rear platen member with a platen actuation means for linearly moving the platen along the tie rods;
   c) a plurality of longitudinal beam members extending between and connected with the forward and rear plate members for spacing the plate members a predetermined distance from each other and for transmitting longitudinal forces between the plate members, the longitudinal beam members positioned inwardly of and adjacent to each of the front and rear guide apertures; and
   d) a plurality of transversely extending beam members carried on the front face of the rear plate member, each transversely extending beam member extending between a respective pair of longitudinal beam members.

10. A mold platen for carrying one part of a multiple part mold, said mold platen comprising:
    a) a closed, hollow, generally rectangular platen structure having rectangular cross-sections in both longitudinal and transverse directions, the platen structure having a front wall including an outwardly facing front face adapted to receive and support the one mold part, and a rear wall spaced from the front wall and having an outwardly facing rear face adapted to be connected with a platen actuation means for moving the platen structure along a plurality of parallel tie rods for movement toward and away from a cooperating mold portion;
    b) a plurality of longitudinally extending beam members positioned inwardly of outer surfaces of the platen structure and extending between and interconnecting the front and rear walls;
    c) transversely extending beam members integrally formed on an inner surface of the rear wall of the platen structure and extending between pairs of laterally spaced longitudinal beam members.

11. A mold platen in accordance with claim 10 wherein the platen structure includes a substantially rectangular opening formed in each upper, lower, and left and right side surface.

* * * * *